Dec. 26, 1922.

J. P. DILLIN.
INSECT TRAP.
FILED JULY 18, 1922.

1,439,874.

Inventor.
Joseph P. Dillin,
By
Attorneys.

Patented Dec. 26, 1922.

1,439,874

UNITED STATES PATENT OFFICE.

JOSEPH P. DILLIN, OF ARDMORE, PENNSYLVANIA.

INSECT TRAP.

Application filed July 18, 1922. Serial No. 575,834.

*To all whom it may concern:*

Be it known that I, JOSEPH P. DILLIN, a citizen of the United States, residing at Ardmore, in the county of Montgomery and State of Pennsylvania, have invented certain Improvements in Insect Traps, of which the following is a specification.

This invention is an insect trap of simple, inexpensive and durable character adapted for enticing insects therein and destroying them.

My improved trap is characterized by two boards or plates hinged together so that one will rock relatively to the other and close a wedge shaped opening or openings between them, with resulting destruction of insects that have taken cover between the boards.

Figure 1:
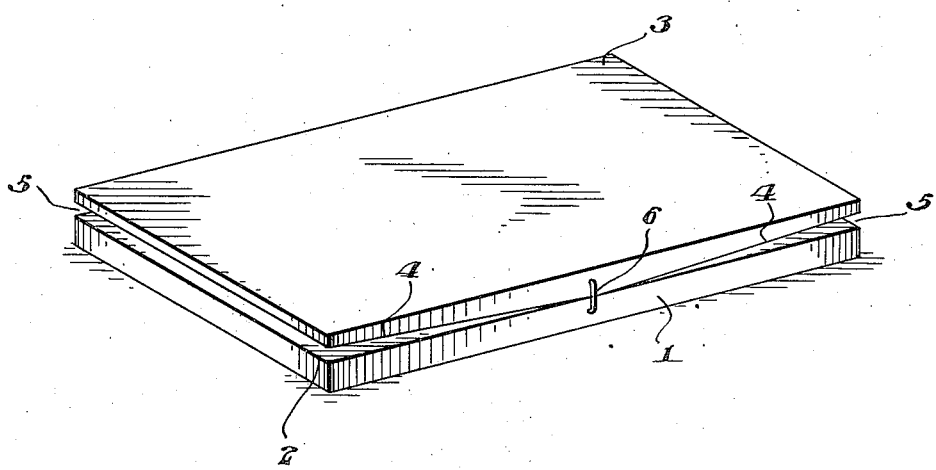
Figure 2:
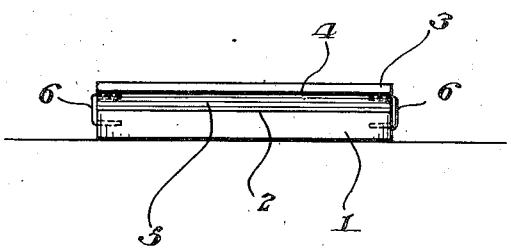

In the accompanying drawings, Fig. 1 is a perspective view of an insect trap made in accordance with my invention, and Fig. 2 is an end view of the same.

The trap illustrated in the drawings comprises a baseboard 1 having the top surface 2 and a top board 3 having the inclined bottom surfaces 4 which form with the surface or surfaces 2 the two inwardly tapered wedge shaped openings 5 between the ends of the boards.

Hinges 6, which are shown as U-shaped staples, connect the board 3 in rocking relation with the board 1, the connection being made at the sides of the boards intermediate their lengths so that the intersection of the inclined surfaces 4 is in contact with the surface 2. The hinges 6 can be withdrawn and replaced to separate and reengage the boards so that the inner surfaces 2 and 4 can be cleaned and rubbed with raw meat or other bait, particularly near the middle thereof, to entice the insects into the cracks between the boards where they also naturally seek cover.

It will be understood that when the board 1 is supported pressure applied to either end of the board 3 will close the corresponding opening 5 between the boards and crush any insects therebetween.

This trap is adapted to be placed under the body of a sleeper as under a pillow, and to be operated by the movement of the body to crush insects which may have sought cover therein or have been attracted by the bait.

Having described my invention, I claim:

1. An insect trap comprising a pair of boards connected together in relatively rocking relation, one of said boards having oppositely inclined inner surfaces and the other of said boards having a surface or surfaces cooperating with said inclined surfaces to form spaces tapering inwardly toward the rocking connection between said boards and adapted to be closed by the rocking operation.

2. An insect trap comprising a base board having a plain top surface, a top board having oppositely inclined bottom surfaces coacting with said top surface to form between said boards wedge shaped spaces tapering inwardly from the ends of said boards toward the middle thereof and hinges connecting the sides of said boards intermediate their lengths.

Signed at Philadelphia, in the county of Philadelphia and State of Pennsylvania, this 17th day of July, 1922.

JOSEPH P. DILLIN.